United States Patent
Carlton et al.

(10) Patent No.: US 8,665,899 B2
(45) Date of Patent: Mar. 4, 2014

(54) METHOD AND APPARATUS FOR INTEGRATING A SOFT MOBILE VOIP CLIENT IN A CELLULAR PC CARD

(75) Inventors: Alan G. Carlton, Mineola, NY (US); Robert A. DiFazio, Greenlawn, NY (US); Michael T. McEntee, Stoney Brook, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 885 days.

(21) Appl. No.: 12/101,440

(22) Filed: Apr. 11, 2008

(65) Prior Publication Data

US 2008/0253313 A1 Oct. 16, 2008

Related U.S. Application Data

(60) Provisional application No. 60/911,631, filed on Apr. 13, 2007.

(51) Int. Cl.
*H04L 12/66* (2006.01)
*H04L 12/50* (2006.01)
*H04L 12/28* (2006.01)
*H04J 1/00* (2006.01)

(52) U.S. Cl.
USPC ........... 370/463; 370/354; 370/359; 370/419; 370/489

(58) Field of Classification Search
USPC ......... 370/328–329, 331–332, 354, 356, 359, 370/419, 463, 467, 489; 709/228
See application file for complete search history.

(56) References Cited

U.S. PATENT DOCUMENTS

| | | | |
|---|---|---|---|
| 2002/0001302 A1* | 1/2002 | Pickett | 370/352 |
| 2002/0122417 A1 | 9/2002 | Miller et al. | |
| 2002/0184546 A1* | 12/2002 | Sherburne, Jr. | 713/322 |
| 2004/0116154 A1 | 6/2004 | Yukie et al. | |
| 2006/0046714 A1 | 3/2006 | Kalavade | |

(Continued)

FOREIGN PATENT DOCUMENTS

| | | |
|---|---|---|
| JP | 3114127 U | 9/2005 |
| KR | 2004-0062339 | 7/2004 |

(Continued)

OTHER PUBLICATIONS

Keineto Keneto Wireless, Inc., "Universal Mobile Access: UMA Expands Beyond Dual-Mode Handsets", A White Paper, (Jan. 2007).

(Continued)

*Primary Examiner* — Redentor Pasia
(74) *Attorney, Agent, or Firm* — Volpe and Koenig P.C.

(57) ABSTRACT

A method and apparatus for integrating a Voice over Internet Protocol (VoIP) client in a wireless PC card are disclosed. A soft mobile phone client is combined with a cellular PC card to create a single physical device that is capable of providing VoIP services to a computer user through the cellular capabilities of the device itself, or alternatively, through any other Internet connectivity available to the computer. When a user inserts the VoIP client/Cellular PC Card into a computer, a graphical user interface (GUI) within the connection manager software is launched allowing the user to communicate VoIP function commands to the VoIP client. A check for Internet connectivity may be performed, at which time the Radio portion of the enhanced PC card may be put into an idle state if connectivity is detected, or may alternatively establish Internet connectivity through the cellular portion of the enhanced PC card.

34 Claims, 3 Drawing Sheets

(56) References Cited

U.S. PATENT DOCUMENTS

| | | |
|---|---|---|
| 2006/0121894 A1 | 6/2006 | Ganesan |
| 2007/0015536 A1 | 1/2007 | LaBauve et al. |
| 2007/0041344 A1* | 2/2007 | Yaqub et al. .................. 370/331 |
| 2008/0132279 A1* | 6/2008 | Blumenthal .................. 455/558 |
| 2008/0176548 A1* | 7/2008 | Liang ............................ 455/419 |
| 2009/0082007 A1* | 3/2009 | De Benedittis et al. ...... 455/423 |

FOREIGN PATENT DOCUMENTS

| | | |
|---|---|---|
| KR | 2005-0033953 | 4/2005 |
| WO | 00/08788 | 2/2000 |
| WO | 02/063901 | 8/2002 |
| WO | 2006/105447 | 10/2006 |
| WO | 2007/022301 | 2/2007 |

OTHER PUBLICATIONS

Keneto Wireless, Inc., "Universal Mobile Access: UMA Expands Beyond Dual-Mode Handsets", A Keineto White Paper, (Jan. 2007).

"Is Cellular Handoff Nigh?" (Feb. 9, 2004) *available at* http://www.wi-fiplanet.com/columns/article.php/3310401.

\* cited by examiner

METHOD AND APPARATUS FOR INTEGRATING A SOFT MOBILE VOIP CLIENT IN A CELLULAR PC CARD

CROSS REFERENCE TO RELATED APPLICATIONS

This application claims the benefit of U.S. provisional application No. 60/911,631, filed Apr. 13, 2007 which is incorporated by reference as if fully set forth.

FIELD OF INVENTION

This application is related to wireless communications. More particularly, this application is related to a method and apparatus for providing a voice over Internet protocol (VoIP) in a wireless PC card.

BACKGROUND

Due to high cellular charges, and in particular roaming and international roaming expenses, users typically use low cost or free voice over internet protocol (VoIP) services, such as the commercially available service Skype™, when an alternate Internet connection option is available instead of cellular service which may be more expensive. This behavior is generally typical amongst business travelers in hotel rooms with a laptop PC at their disposal. In this scenario, an Internet service may be provided via a wired or wireless (e.g. WiFi®) connection in a typical manner. This behavior is, of course, not in the best interest of the cellular provider who effectively loses voice traffic revenues to the free VoIP services.

To counter this threat, technology is currently being introduced that enables the cellular provider to offer the user a VoIP type service such that traffic related to this service is handled by the cellular provider as opposed to a third party network. This technology may take the form of a soft mobile phone client provided by the cellular operator. In a typical embodiment, this soft mobile phone client may reside in a universal serial bus (USB) stick/flash memory form factor along with a subscriber identity module (SIM) card.

Typically, the user will insert the USB/SIM device into their laptop computer, thus launching a soft mobile phone client on the laptop or PC. Subsequently, the soft mobile phone client will search for Internet connectivity on the laptop or PC (e.g. via WiFi®, WiMAX, Bluetooth®, or other connection) and enable the voice service via this connection. The value proposition for this type of approach may include the promise (from the operator) of better QoS and access to the same familiar package of services normally enjoyed via cellular service. A well known technology which enables this type of offering is Unlicensed Mobile Access (UMA) technology, or as it is more commonly known, Generic Access Network (GAN) as specified in the Third Generation Partnership Project (3GPP).

The problem with this approach is that quite often a user, particularly a business user, will also have high speed cellular PC card (e.g. ExpressCard based) in their laptop which is also equipped with a SIM card and may contain other duplicated functions such as the Non-Access Stratum (NAS) that may be found in soft mobile phone clients.

It is quite common for carriers to market numerous phone brands and cellular PC cards in various form factors. One popular form factor (in particular for business users) is the PC card (PCMCIA or ExpressCard) form factor. However, UMA/GAN is typically viewed as a mid end feature-phone feature and not one applicable to PC cards, thereby making the cellular PC card incapable of VoIP communications.

It is a goal of cellular carriers to maximize Average Revenue Per User (ARPU), build customer loyalty and minimize churn. This is principally what a service like UMA/GAN provides. It enables the user to access, typically via WiFi®, networks at their convenience and benefit, but at the same time, continue to use the application services of the carrier. The hidden benefits to the carrier in this arrangement, in addition to possible fiscal benefits from the basic UMA/GAN service subscription, include: reduced customer churn through avoidance of the lure of alternative VoIP services such as Skype™, and continued access to the carrier's pool of services normally only available via the cellular service, for which the customer may be paying a premium while they are accessing the Internet via WiFi®.

FIG. 1 is a functional block diagram of a conventional soft mobile phone client in a USB stick form factor 100. This entity includes a soft mobile client 101, a SIM card 103, an external USB interface 105, and an internal interface 107 between the soft mobile phone client 101 and the SIM card 103. In the preferred embodiment, the soft mobile phone client 101 includes VoIP 109, NAS 111 and UMA/GAN client 113 components. It should be noted that this soft mobile phone client in a USB stick form factor 100 includes no radio functionality. It relies on there being Internet connectivity available at the PC or Laptop into which the soft mobile phone client in a USB stick form factor 100 is inserted.

FIG. 2 is a functional block diagram of a conventional wireless cellular PC card 200 based on Third Generation Partnership Project (3GPP) technologies. FIG. 2 shows the basic functional architecture of a typical cellular PC card 200. Minimally, this entity in a preferred embodiment includes NAS 111, Access Stratum (AS) 203 and radio frequency (RF) (e.g. WCDMA) 205 components, as well as possibly a host of other peripheral functions 207. The cellular PC card may also include SIM card 103 functionality although it is possible that the SIM card 103 (for example in the case of the mini-card form factor) is remote, and may be located in the laptop in a location such as under the battery. The cellular PC card 200 may be connected to the PC through one of a variety of interfaces 211. In this preferred embodiment an ExpressCard interface is shown.

Issues arise when desired functionality, such as wireless services and UMA/GAN, are contained in multiple physical devices. First, there is the unattractive overhead of dealing with multiple peripheral devices when one would be preferable. Therefore, it would be beneficial to combine these functions into a single physical entity.

SUMMARY

A method and apparatus for integrating a Voice over Internet Protocol (VoIP) client in a wireless PC card are disclosed. A soft mobile phone client is combined with a cellular PC card to create a single physical device that is capable of providing VoIP services to a computer user either through the cellular capabilities of the device itself, or alternatively, for example, when the cellular service is unavailable or may be in a roaming state, the VoIP client is functional through any other Internet connectivity available to the computer. When a user inserts the VoIP client/Cellular PC Card into a computer, a graphical user interface (GUI) contained within the connection manager software is launched that allows the user to communicate VoIP function commands to the VoIP client. A check for Internet connectivity may be performed, at which time the Radio portion of the enhanced PC card may be put into an idle or sleep state if connectivity is detected, or may alternatively establish Internet connectivity through the cellular portion of the enhanced PC card.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The term computer or PC may be any device capable of supporting a voice call. Such devices include, but are not limited to, laptop computers, PDA's, cellular telephones, Mobile Internet Devices (MIDs), Ultra Mobile PCs (UMPC), automobiles and any other device that may interface with a PC card.

Figure 1:
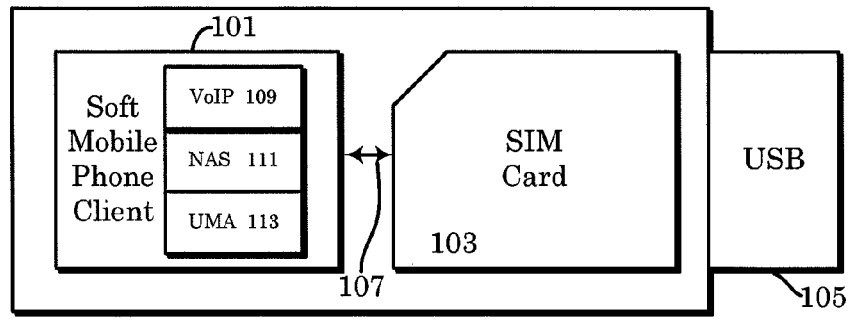
FIG. 1 is a functional block diagram of a VoIP client in a conventional USB stick form factor.
Figure 2:
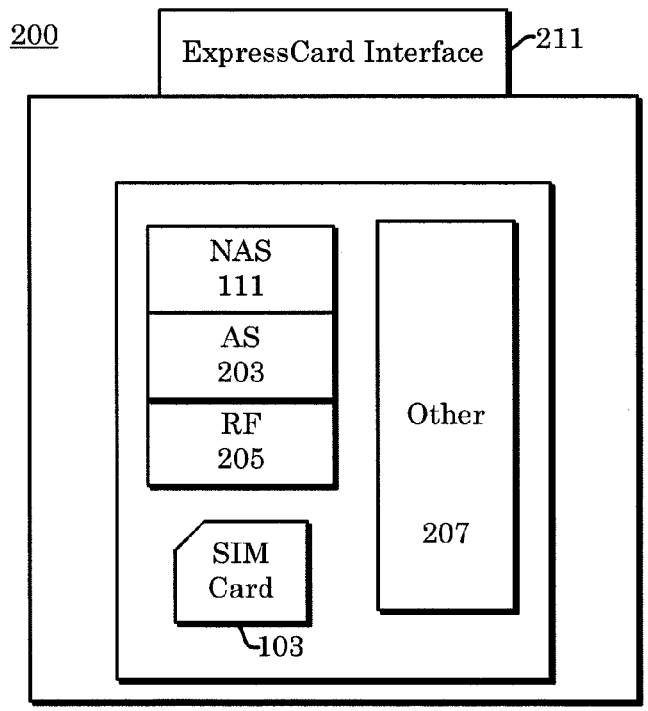
FIG. 2 is a functional block diagram of a conventional wireless PC card.
Figure 3:
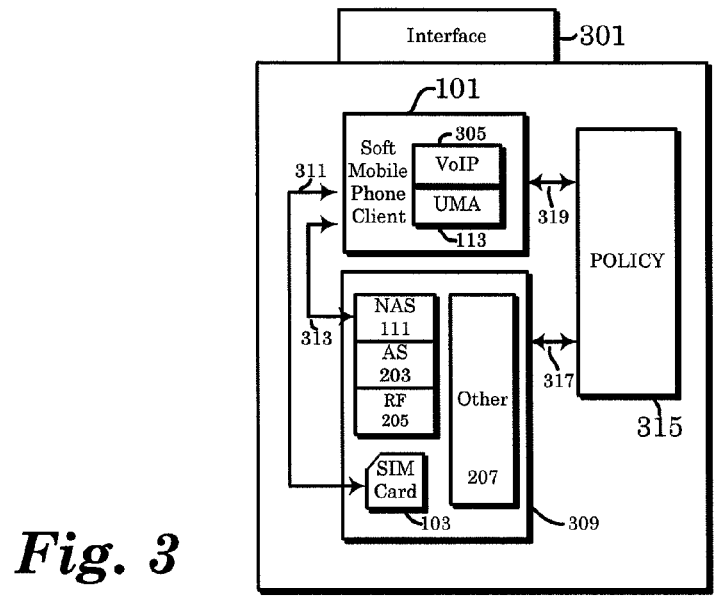
FIG. 3 is a functional block diagram of a wireless PC card with a soft VoIP client integrated into the card.

Referring to FIG. 3, a functional block diagram of an enhanced cellular PC card 300 is shown. Here, the soft mobile phone client 101 functionality is included with wireless connectivity 309. The soft mobile phone client 101 no longer requires a Non-Access Stratum (NAS) 111 because this functionality is already included in the wireless connectivity 309. Instead, a software interface 313 is introduced to allow the soft mobile phone client 101 to access NAS 111 functionality in the wireless connectivity 309 as shown. The soft mobile phone client 101 now comprises a reduced set of functions that will, at a minimum, include Unlicensed Mobile Access/Generic Access Network (UMA/GAN) 113 and Voice over Internet Protocol (VoIP) client functions 305. Additionally, the soft mobile phone client 101 may use the SIM card 103 included with the wireless connectivity 309. For this purpose a software interface 311 may be provided.

Alternatively, if the SIM card 103 is remotely located, for example in a computer, then an external interface 301, for example, a Low Pin Count (LPC) bus, direct connection with the SIM or PCI bus, may be provided. Additionally, a SIM may not be a physical device such as a card, but rather SIM functionality implemented in machine readable instructions that is executed on a trusted processor in the PC card 300 or the computer. While an external or software SIM 103 is not shown for the sake of simplicity, such configurations and the communications between the enhanced cellular PC card 300 and the SIM card 103 via the computer bus or other internal or external PC Card interfaces falls within the intended scope of this specification.

A policy 315 may interface with both the soft mobile phone client 101 as well as the wireless connectivity 309 through software 319, 317, respectively. The policy 315 may be included in the enhanced cellular PC card 300 provided via the SIM card 103, provided by the operator or in any other configuration that enables the policy to be utilized by the wireless connectivity 309 and the soft mobile phone client 101. The policy may be initially configured or modified by the operator using, for example, a Firmware Over the Air (FOTA) process. The purpose of this policy 315 is to define a set of rules and provide coordination between the two points of connectivity 101, 309. For example, the policy 315 may dictate that when the soft mobile phone client 101 sees WiFi® Internet connectivity, voice and data calls should be established through this path and the wireless connectivity 309 component should be put into an idle or sleep state.

In another embodiment, the policy configuration may be to let the network set the default configuration, but include options for the user to set preferences including, but not limited to, UMA/GAN off, default to cellular even when alternative IP connectivity is available (or vice versa), alert the user of the network being used, remember settings for each network, (for example, when a traveler returns to a hotel with poor WiFi reception, not to try connecting again or alert the user to the previous settings), recognize other VoIP services on the computer, for example, through Vonage™ or Skype™ and, when detected, alert or allow the user to change the preferred connection to the cellular operator. The connection manager 413 may be used to provide user defined aspects of the policy configuration.

In one embodiment, the wireless connectivity 309 and soft mobile phone client 101 combination in the PC card 300 do not include any other connectivity mechanism other than the RF module 205. In this embodiment, alternate IP connectivity, for example, via a hard-wired Internet connection, WiFi®, WIMAX, Bluetooth®, and the like, require such capabilities to be provided via the computer. For example, this functionality may be embedded in the computer or it may be available via another peripheral device inserted into the computer.

In general, a PC card may be a multi-mode device that includes other wired or wireless IP connectivity (i.e. WIMAX or WiFi® may be implemented on the same PC card as the soft mobile phone client and wireless connectivity utilizing the RF 205, AS 203, and NAS 111). In such a case, the PC card will have internal hardware or software interfaces to the other IP connectivity as well as, if required, hardware and software interfaces to the PC platform. Thus the IP connectivity may be through the computer or the PC card. Similarly, part or all of the connection manager 413 software may reside on the PC card and other subsystems (e.g. audio) may also reside on the PC card. For simplicity, the description treats a PC card that does not include other wired or wireless IP connectivity, any part of the connection manager, or other subsystems, but such configurations fall within the scope of this specification.

Figure 4:
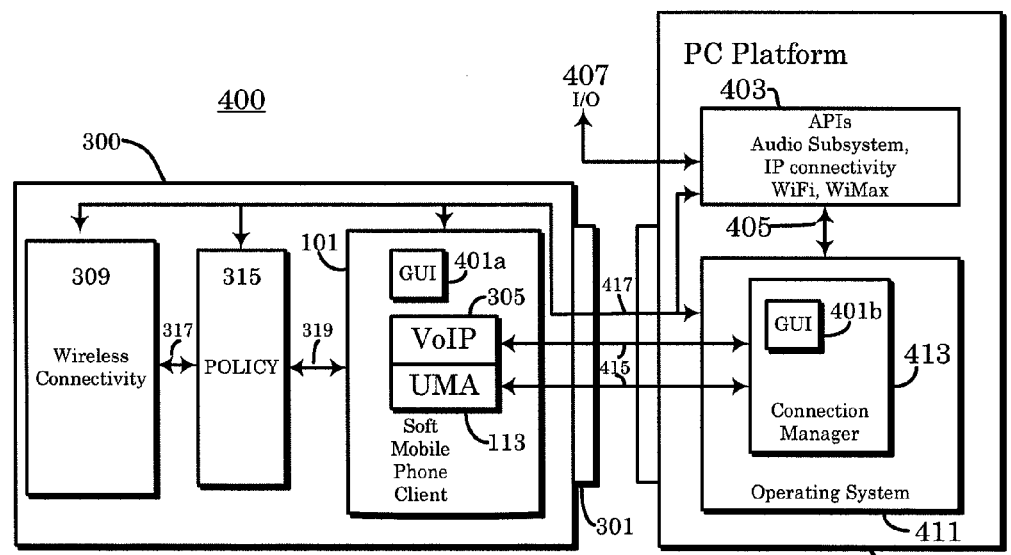
FIG. 4 is a functional block diagram of the wireless PC card of FIG. 3, and the PC platform with which it interfaces.

FIG. 4 shows a functional block diagram utilizing this arrangement in a phone system 400, where the enhanced cellular PC card 300, in concert with a Personal Computer 409 into which it is inserted, may offer a complete voice service to the end user. Typical PC operating systems 411, such as Windows®, provide well defined Application Programming Interfaces (APIs) 403 that enable access to Internet connectivity, audio subsystems, WiFi®, WiMAX as well as other subsystems within the computer. These subsystems may be accessed directly via the Soft Mobile Phone Client 101 in the enhanced cellular PC card 300 or via a connection manager 413 or driver function through connections 415. Similarly communications 417 may be enabled between wireless connectivity 309, policy 315 and the soft mobile phone client 101 in the enhanced PC Card 300 and the APIs 403, and the operating system 411 in the computer 409. The enhanced cellular PC card 300 provides the VOIP client 305, which may optionally include a phone graphical user interface (GUI) implemented in a software module 401a, and UMA/GAN 113 functionality. The PC 409 provides key I/O functions 407 required to complete a phone system 400. Optionally, the connection manager 413 may include a GUI implemented in software 401b that is capable of generating a GUI interface on the PC 409 display.

From an end user perspective, the system 400 would operate as follows: upon connection of the enhanced cellular PC card, the GUI functionality would automatically be launched. Typically, if the GUI 401a is in the enhanced cellular PC card 300, this would be the case. By way of example, the GUI 401a may be a graphical representation of a cellular phone. This may automatically appear on the PC 409 display or may be discretely concealed in an icon on a toolbar that must be clicked to launch. Alternatively, if the GUI 401b is part of the connection manager 413, for example, as an application running on the OS 411 in the PC 409 then a manual action by the end user may be required to launch the GUI 401b. With the GUI 401b launched and Internet connectivity available (wired or wireless) via the PC 409, the end user may proceed to make phone calls utilizing the method described below. While aforementioned GUI is provided by way of example, one skilled in the art will recognize that other means for initiating or terminating a call may be used, such as text entry, software configured to automatically dial, or a handset or other peripheral that allows dialing or initiation and/or termination of a phone call.

Figure 5:
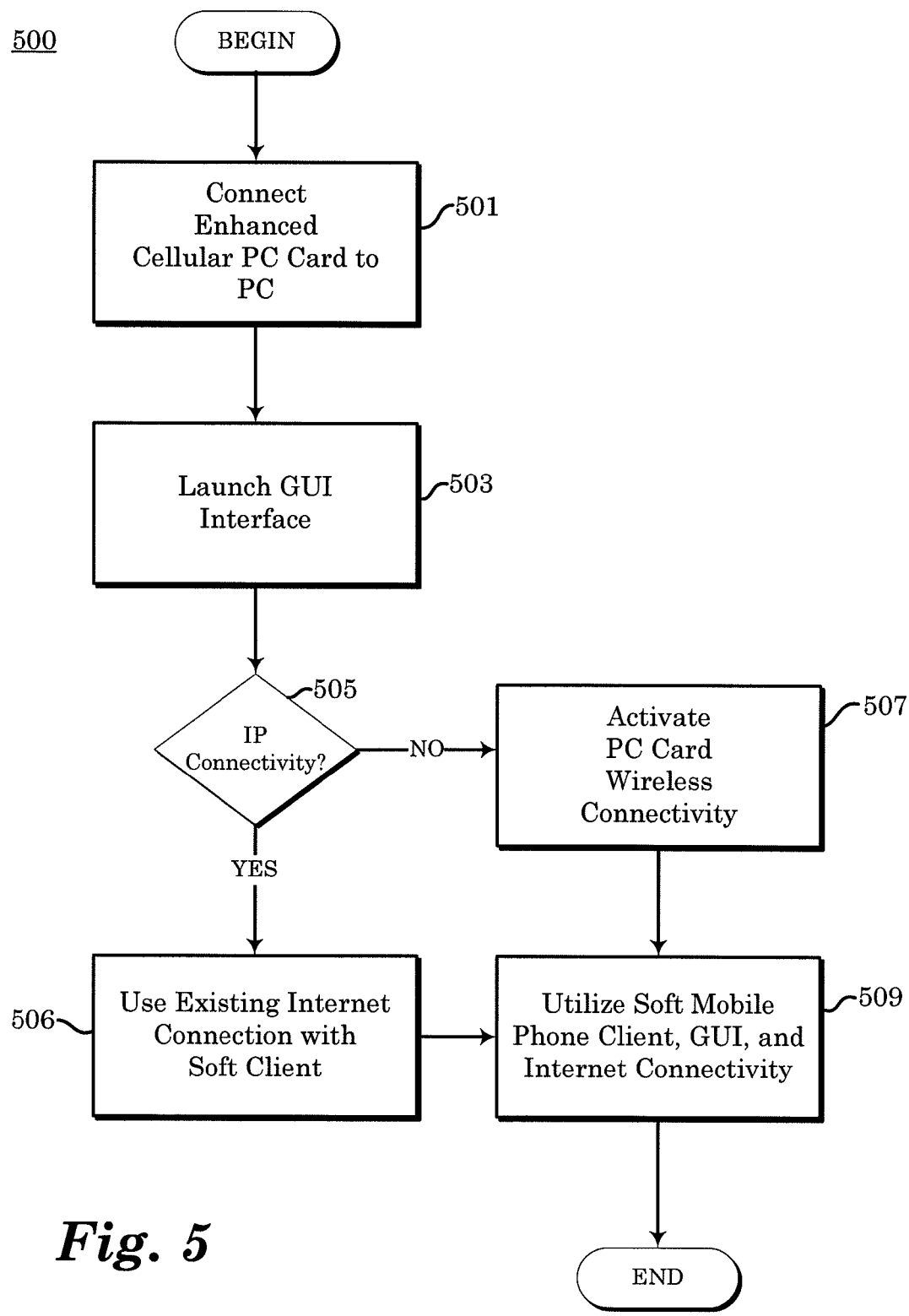
FIG. 5 is a method of using a soft VoIP client along with a cellular wireless PC card.

Referring to FIG. 5, a method of making a VoIP phone call utilizing an enhanced cellular PC card 500 is described. The enhanced cellular PC card is first connected to the computer through a compatible interface (block 501). The compatible interface may be USB, Express Card, Mini Card, or any interface capable of supporting data communications between the enhanced cellular PC card and the computer. When the enhanced cellular PC card is connected to the computer, the GUI interface is launched in block 503. The graphical user interface enables the user to operate the computer as if it were a phone. The graphical user interface may be a representation on the computer display of a cellular phone, or simply a dial pad, voice dialer or other type of display for placing or receiving a call. The graphical user interface may reside on the enhanced cellular PC card, in which case the act of connecting the card to the computer may automatically launch the GUI. Alternatively, the GUI may reside within the connection manager software of the computer's operating system, in which case the graphical user interface may be launched manually by the user at the computer. The VoIP client then checks to see if there is Internet connectivity (block 505). Internet connectivity may be provided by the enhanced PC modem card's radio frequency (RF) wireless capabilities, or alternatively, may be provided through another connection to which the computer has access, such as a hard wired network, or a WiFi® connection to which the computer has access by a wireless transceiver located somewhere other than the enhanced cellular PC modem card. If Internet connectivity is available, the existing connection to the Internet is used (block 506). If no Internet connectivity is detected, the cellular wireless capability of the enhanced cellular PC card is activated and a connection with the Internet is established.

Once Internet connectivity is established, the soft mobile client establishes the VoIP communication through the Internet connection and provides voice calling via the soft mobile phone client, and the Internet connection (block 509). FIG. 5 is an example of a selected policy, but other policies may result in different options, such as using a traditional switched circuit voice connection if one is available.

Although a UMA/GAN based soft mobile phone client approach may be used, additional approaches may be utilized. For example, a soft mobile phone client based upon the IEEE 802.21 standard may be used. Alternatively, the mobile phone soft client may use information associated with the policy to utilize aspects of the 802.21 standard. Other protocols that enable VoIP, for example, Session Initiation Protocol (SIP) may be used. This configuration of wireless connectivity, soft mobile client, and policy may present a compelling offering to cellular operators as it provides the ability to market a single PC product, and maintain a good degree of control and manage the use of all wireless connectivity means collectively available in the enhanced cellular PC card and the computer into which the enhanced cellular PC card is inserted.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. An apparatus configured to communicate with a computer through a communications interface, the apparatus comprising:
a soft mobile phone client configured to provide Voice over Internet Protocol (VoIP) communications, the soft mobile phone client including a first set of a plurality of communications modules, wherein the first set of a plurality of communications modules does not include a non-access stratum (NAS) module;

a cellular modem configured to provide cellular Internet Protocol (IP) connectivity to the computer, the cellular modem including a second set of a plurality of communications modules, wherein the second set of a plurality of communications modules includes a NAS module, and wherein the soft mobile phone client is configured to establish IP connectivity through the cellular modem and provide IP connectivity to the computer on a condition that a pre-existing IP connection via the computer is not available;

a software interface configured to communicate with the soft mobile phone client to access at least one of the second set of the plurality of communications modules; and the cellular modem further configured to enter an idle mode on a condition that IP connectivity is detected from the computer.

2. The apparatus of claim 1, wherein the first set of the plurality of communications modules comprises:
an unlicensed mobile access/generic access network (UMA/GAN) module; and
a VoIP module.

3. The apparatus of claim 2, wherein the soft mobile phone client further comprises software that executes a graphical user interface (GUI) configured to provide VoIP voice calling functionality between a user and the VoIP module.

4. The apparatus of claim 3, wherein the GUI is a graphical representation of a telephone.

5. The apparatus of claim 1, wherein the second set of the plurality of communications modules further includes:
a radio frequency (RF) module; and
an access-stratum (AS) module.

6. The apparatus of claim 5, wherein the cellular modem further comprises a subscriber identity module (SIM) card.

7. The apparatus of claim 1, wherein the first set of the plurality of communications modules comprises:
an IEEE 802.21 module; and
a VoIP module.

8. The apparatus of claim 7, wherein the soft mobile phone client further comprises a graphical user interface (GUI) configured to provide VoIP voice calling functionality between a user and the VoIP module.

9. The apparatus of claim 8, wherein the GUI is a graphical representation of a telephone.

10. The apparatus of claim 7, wherein the second set of the plurality of communications modules further includes:
a radio frequency (RF) module; and
an access stratum (AS) module.

11. The apparatus of claim 10, wherein the cellular modem further comprises a subscriber identity module (SIM) card.

12. The apparatus of claim 1, wherein the first set of the plurality of communications modules comprises:
a Session Initiation Protocol (SIP) module; and
a VoIP module.

13. The apparatus of claim 12, wherein the soft mobile phone client further comprises a graphical user interface (GUI) configured to provide VoIP voice calling functionality between a user and the VoIP module.

14. The apparatus of claim 13, wherein the GUI is a graphical representation of a telephone.

15. The apparatus of claim 12, wherein the second set of the plurality of communications modules further includes:
a radio frequency (RF) module; and
an access stratum (AS) module.

16. The apparatus of claim 15, wherein the cellular modem further comprises a subscriber identity module (SIM) card.

17. The apparatus of claim 1, wherein the second set of the plurality of communications modules further includes:
a radio frequency (RF) module; and
an access stratum (AS) module.

18. The apparatus of claim 17, wherein the cellular modem further comprises a subscriber identity module (SIM) card.

19. The apparatus of claim 1, wherein the communications interface is a universal serial bus (USB) interface.

20. The apparatus of claim 1, wherein the communications interface is an ExpressCard interface.

21. The apparatus of claim 1, wherein the communications interface is a Mini PCI-e interface.

22. The apparatus of claim 1, wherein the communications interface is a Personal Computer Memory Card International Association (PCMCIA) interface.

23. The apparatus of claim 1, wherein the communications interface is a Cardbus interface.

24. A method of enabling Voice over Internet Protocol (VoIP) communications in a computer, comprising:
connecting a peripheral device to the computer via a communications interface, wherein the peripheral device comprises:
a cellular modem portion that includes a first set of a plurality of communications modules, wherein the first set of a plurality of communications modules includes a non-access stratum (NAS) module;
a soft mobile phone client portion that includes a second set of a plurality of communications modules, wherein the second set of a plurality of communications modules does not include a NAS module; and
a software interface located between the cellular modem portion and the soft mobile phone client portion;
providing, via the cellular modem portion, cellular Internet Protocol (IP) connectivity to the computer, wherein the soft mobile phone client portion is configured to establish IP connectivity through the cellular modem portion and
provide IP connectivity to the computer on a condition that a pre-existing IP connection via the computer is not available;
accessing, via the soft mobile phone portion, at least one module of the first set of the plurality of communications modules of the cellular modem portion via the software interface; and
entering the cellular modem portion into an idle mode on a condition that no IP connectivity is detected from the computer.

25. The method of claim 24, wherein the soft mobile phone client portion is based on an IEEE 802.21 implementation.

26. The method of claim 24, wherein the soft mobile phone client portion is based on a Session Initiation Protocol (SIP) implementation.

27. The method of claim 24, wherein the soft mobile phone client portion is based on an Unlicensed Mobile Access (UMA) implementation.

28. The method of claim 24, wherein the GUI executable is resident in the peripheral device as part of the soft mobile phone client portion.

29. The method of claim 24, wherein the GUI executable is resident in a memory in the computer.

30. The method of claim 24, wherein the peripheral device further comprises a policy comprising machine readable instructions for establishing IP connectivity by the cellular modem portion and performing VoIP communications by the soft mobile phone client portion and coordinating operations between the soft mobile phone client portion and the cellular modem portion.

31. The method of claim 30, wherein the policy is resident in a firmware of the peripheral device.

32. The method of claim 30, wherein the policy is provided by a cellular operator via Firmware Over The Air (FOTA).

33. The method of claim 30, wherein the peripheral device further comprises a subscriber identity module (SIM) portion.

34. The method of claim 33, wherein the policy is resident in the SIM portion.

* * * * *